March 9, 1943. L. S. WERTZ 2,313,110
PROCESS FOR FILLING CAVITIES
Filed Feb. 28, 1940 2 Sheets-Sheet 1

INVENTOR
Louis S. Wertz
BY Evans + McCoy
ATTORNEYS

Patented Mar. 9, 1943

2,313,110

UNITED STATES PATENT OFFICE 2,313,110

PROCESS FOR FILLING CAVITIES

Louis S. Wertz, Cleveland, Ohio

Application February 28, 1940, Serial No. 321,222

13 Claims. (Cl. 72—106)

This invention relates to a process for filling cavities, and in particular to a process which may be used in repairing or constructing concrete, masonry, brick, stone or other similar structures or portions thereof. The invention is especially applicable to the weatherproof restoration of concrete structures having disintegrated portions which may extend to an appreciable depth from the surface.

In the preparation and repair of disintegrated portions of concrete and masonry structures as heretofore practiced, the disintegrated and loose material is chipped away and the resulting cavity filled up by spraying a mixture of cement, sand and water onto the chipped irregular surface. This method is not very satisfactory, however, because the shrinkage of the material placed in the repair area is relatively high. This high shrinkage may be caused in part by the high proportion of cement particles and in part by the fact that most, if not all, of the solid particles in the mix are separated by a cement paste so that the solid particles are actually drawn together upon drying and shrinkage of the cement paste, and the repair area as a whole is contracted. Thus, upon drying, the cavity filling may separate from the old structure. Further, since the surfaces of the structure after removal of loose material are usually irregular and exceedingly hard to fill completely by spraying, it has been found that there are actually voids between the repair area and the existing structure, with the result that the repair area becomes defective in a relatively short time.

It is, therefore, an object of the present invention to provide a method for repairing disintegrated areas on the surfaces of structures which results in the production of a very strong bond between the repair area and the old structure, and which produces substantially no voids between the repair area and the existing structure.

Another object is to provide a process for filling cavities, whether in repair work or new construction, wherein the cavity is filled with a substantial amount of already solid material.

Another object is to provide a process for constructing or repairing portions of concrete or other structures wherein the shrinkage of the newly constructed area is minimized.

A further object is to provide a process for filling cavities by which a substantial amount of the water content of the composition used to fill the cavity is extracted from the repair area so that a very strong and dense cavity filling is produced, and there is very little shrinkage of the repair area.

Another object is to provide a method of forming a surface on concrete, masonry, or other structures, which surface will have a decorative appearance as well as be highly resistant to weathering.

A still further object is to provide a process of filling cavities which is efficient and economical and results in a cavity filling which is strong, dense, substantially impervious and highly resistant to weathering.

Other objects will be apparent from the following detailed description of the process as illustrated by the drawings in which like parts throughout the several views are indicated by the same reference numerals.

Figure 1:
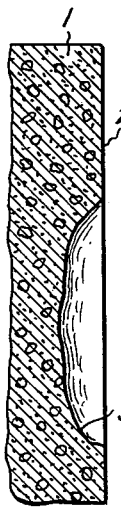
Figure 1 is an elevational, sectional view of a portion of a structure which has become disintegrated, and from which the faulty material has been removed prior to its being repaired in accordance with this invention.

According to the process of the present invention, the cavity to be filled is produced by removing disintegrated, faulty, or loose material and the like from the surface of an existing structure by chipping or other suitable means, and enclosing the resulting recess by a form, or by defining with suitable form members a cavity at which location a structure or portion thereof is to be built. If the circumstances are such that removal of an entire surface of an existing structure is desired or necessitated, the cavity may be defined by several suitable form walls and the remaining portions of the existing structure. For purposes of simplification, the invention will be fully described in connection with the restoration of a disintegrated portion of a structure, such as for example, a concrete wall, where the cavity to be filled is a recess formed by removal of undesired material covered by a suitable form.

When the material of the existing structure is removed, the cavity which now has solid walls is covered by a form and filled with a suitable loose aggregate or the like. To arrange the aggregate so as to minimize the void spaces between individual particles of aggregate and increase the density of the cavity filling, the aggregate may be impacted or vibrated in a suitable manner during or after filling the cavity therewith, and a solidifying composition may be forced under pressure into the cavity to fill the voids between the individual pieces of aggregate and between the aggregate and the cavity walls. When the cavity is partially defined by a portion of the existing structure, the solidifying composition may also be forced into any voids or interstices in the portions of existing structure adjacent to or communicating with the cavity. When the composition has solidified, the individual pieces of aggregate are bonded into a unit and the cavity filling as a whole is bonded to the existing structure. Due to the fact that the cavity has been filled with aggregate which is already solid and the voids of the cavity are only those between individual pieces of aggregate, shrinkage of the cavity filling may only occur in the solidifying composition used to fill such voids. Therefore, the cavity filling as a whole will not shrink appreciably when the solidifying composition has dried.

It is often desirable that the member or form used to define portions of the cavity be porous or absorptive so that after the solidifying composition is forced into the cavity an appreciable part of the water content thereof may be removed through the form in any suitable manner. When the composition includes hydraulic cement, the water to cement ratio throughout the repair area may thus be appreciably lowered and the strength of the composition will be greatly increased when set. Further, the reduction of water to cement ratio at the surface of the cavity filling adjacent the form may be relatively great so that an extremely hard surface is provided which is highly resistant to weathering and the attendant surface cracking and checking.

Referring more particularly to the drawings, a concrete structure 1 having a surface 2, into which a recess 3 has been formed by removal of faulty or disintegrated material, is drilled at suitable positions to provide anchor holes 4 for the form holding bolts 5, which are of suitable strength and are suitably spaced to securely hold a form, indicated generally by the numeral 6, against the face or surface 2 of the concrete structure 1 so as to enclose the recess 3 and define a cavity C. As shown in the drawings, the form 6 comprises members 7, 8, 9, 10 and 11, which may be boards of suitable length and width to completely cover the cavity 3, and supporting members 12 which are drilled for the bolts 5 and adapted to hold the boards 7, 8, 9, 10 and 11 rigidly against the surface 2 of the structure adjacent the recess 3. The bolts 5 may be of the expansible type which are adapted to fit into bores 4 and may be expanded to hold thereto by frictional engagement, or they may be of any other suitable type. If desired, a suitable seal may be provided around the periphery of the form between the form and the structure. Such a seal may comprise an amount of fine sand held tightly between the form and the existing structure.

Figure 2:
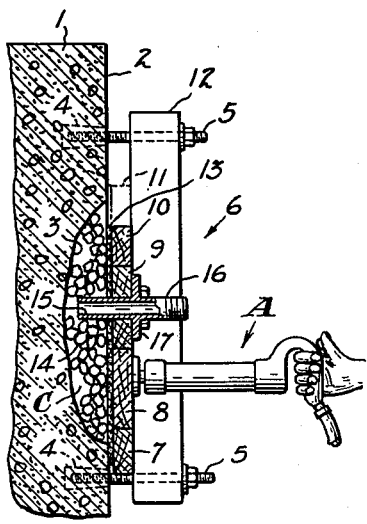
Fig. 2 is a view similar to Fig. 1 showing the cavity partly filled with loose aggregate which is held therein by a suitable form.

In the repair of a vertical wall of a structure, the top member or board 11 of the form may be omitted until the major portion of the cavity C has been filled with loose aggregate. With the form member 11 omitted, as illustrated in Fig. 2, the aggregate 14 may be poured into the cavity in sufficient quantities to substantially fill it, and any unfilled portion may be filled as the top member is inserted under the holding members 12.

When the cavity is on the underside of a horizontal surface, form 6 may completely cover the empty cavity and the cavity may be filled by blowing the aggregate in with a high velocity stream of compressed air, or by other suitable means.

The form members may be made of a porous material, but due to the structural weakness of available porous materials, the forms are usually made of wood and lined with a suitable porous material. As may be seen in Fig. 2, the interior surface of the form members adjacent the recess 3 is lined with sheets of suitable porous, absorptive material 13, such, for example, as pressed fibrous material, sponge rubber, etc.

The aggregate which has been placed in the cavity is desirably impacted or vibrated in a suitable manner so that the total void space between the particles of aggregate is minimized. Fig. 2 shows a suitable vibrator or impacting means, indicated by A, in position against the exterior of the form members to transmit impacts to the aggregate in the cavity and compact it.

Figure 3:
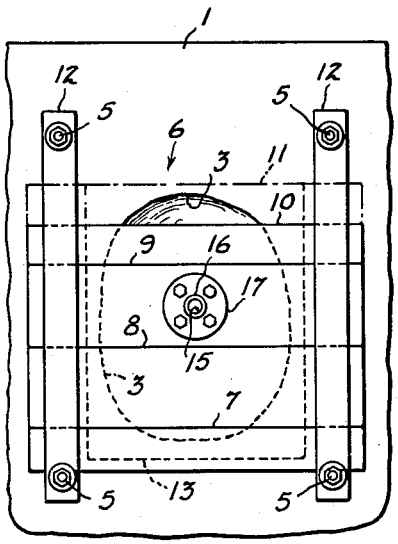
Fig. 3 is an elevational front view of the portion of the structure shown in Fig. 2, showing how the form may be attached over the cavity.

After the cavity C, as illustrated in Figs. 2 and 3, has been filled with loose aggregate and impacted or vibrated, the cavity is ready to be filled with a suitable solidifying composition. For this purpose one of the members, such as the member 9, may be provided with a passage 15 into the cavity having suitable connecting means for making connection with apparatus capable of forcing the composition into the cavity. Passage 15 may be in communication with the bore of a pipe nipple 16 having an exterior threaded portion for making connection with a source of supply and a flange 17 so that the nipple 16 may be rigidly fastened to the member 9 covering the surface of the cavity. A connection may then be made between the nipple 16 and a suitable apparatus for forcing a solidifying composition into the cavity throughout the aggregate and into contact with the solid walls of the cavity. Instead of passing through the form, the passage through which the solidifying composition is introduced may be formed at an angle through a portion of the existing structure.

Figure 4:
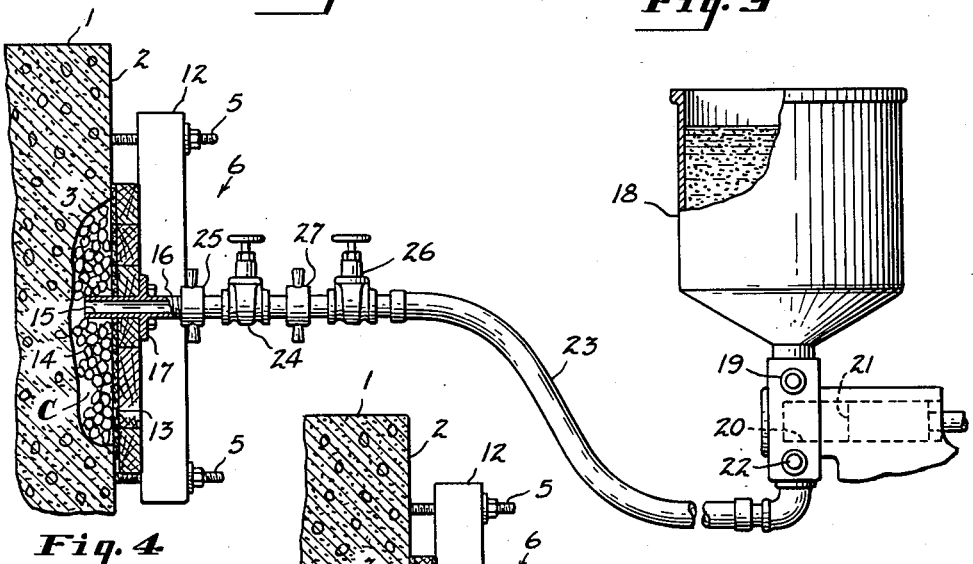
Fig. 4 is an elevational view, with parts broken away, of apparatus for use in the present invention, illustrating diagrammatically a way by which the cavity may be filled by forcing a suitable material into the cavity and through the aggregate.

Apparatus for forcing a suitable composition into the cavity is illustrated in Fig. 4.

The composition may be mixed and kept available in a suitable container 18, which container has a valve 19 to control the passage of material from the container into the cylinder 20 of a suitable positive displacement pump. Piston 21 forces the material from the cylinder 20 through an outlet valve 22 into a suitable conduit or hose line 23, the hose line being connectable to the pipe nipple 16. If desired, the valves 19 and 22 may be operated automatically to allow the flow of material from the container into the cylinder 20, and from the cylinder to the hose line 23 at the proper times. Thus, to force material into the cavity 3, it is only necessary to fill the container 18 with the solidifying composition and start the operation of the pump, whereby material will be forced through the hose line 23, the pipe nipple 16, and the passage 15, and into the cavity, filling the voids between the individual pieces of aggregate. Then, when the cavity has been filled with solidifying composition, an appreciable part of the water content of the composition may be removed.

Figure 5:
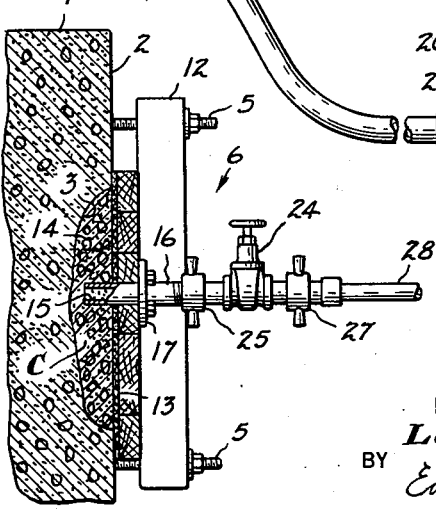
Fig. 5 is a sectional view similar to Fig. 4 showing a cavity which has been completely filled according to this invention and showing a connection which may be used to maintain pressure on the material in the cavity to hold it in place and to extract water content of the material until the material is sufficiently firm to stay in place.

For example, fluid pressure may be maintained on the composition by connecting a compressed air or gas line to the nipple 16. To facilitate this connection a valve 24 is connected to the nipple 16 by a suitable coupling 25. The valve 24 is in turn connected to a second valve 26 by a suitable coupling 27, the valve 26 being secured to the composition feed line 23. When it is desired to change the line 23 to a line or conduit 28 carrying compressed air or gas, valves 24 and 26 may be closed to prevent the escape of the solidifying composition, and by unscrewing the coupling 27, the valve 26 and the line 23 may be removed and the line 28 connected to the valve 24 by the coupling 27 (see Fig. 5). The valve 24 may then be opened to allow the fluid pressure in the line 28 to communicate with the solidifying composition in the cavity and force water contained in the composition into and through porous material 13.

Another method of decreasing the water content of the composition is to impact or vibrate the composition while it is in place in the cavity. This may be done by disposing an impacting or vibrating means in contact with the form so that the impacts or vibrations will be communicated to the composition and water in the composition will flow to and through the porous form. If desired, the impacting or vibrating may be carried out in addition to the maintaining of fluid pressure on the solidifying composition. It is contemplated that the impacting or vibrating may be carried out during the forcing of the solidifying composition into the cavity. This is advantageous because the rate of withdrawal of the water content may be increased, a greater degree of penetration of the solidifying composition into the finer voids and interstices between pieces of aggregate and in the existing structure may be obtained, and because impacting tends to consolidate the composition during withdrawal of the water content.

The water content of the composition may also be decreased by applying a vacuum to the exterior of a porous form by any suitable means to draw off water from the composition. This method is similar to the maintaining of fluid pressure on the composition, as previously described, in that there is a difference in pressure created and maintained between the pressure on the solidifying composition and the atmospheric pressure at the exterior of the form, which results in the flow of water through the form.

Of course it is not necessary that the water content of the solidifying composition be removed. Where the cavity is partially bounded by a concrete structure a portion of the water content may pass through the pores of the concrete structure and the same result may be reached. In other cases, a solidifying composition having sufficient strength without water removal is advisable.

Many types of aggregates may be used in carrying out the present invention, and the selection of the proper aggregate will depend upon the characteristics of the cavity and the type of structure being erected or repaired, bearing in mind that the possibility of shrinkage of the cavity filling as a whole is decreased when the total void space between the pieces of aggregate is a minimum. For restoring disintegrated portions of concrete structures, such as shown in the drawings, it is generally desirable that the individual pieces of aggregate be relatively small, and examples of aggregate for this use are crushed rock, pea gravel and the like. While not controlling, the following standards are indicative of what has been found desirable to consider in choosing an aggregate. For ordinary work the minimum size should not be less than will pass through a screen having four meshes to the inch, and the maximum size of the pieces of aggregate should not be greater than one-fourth of the depth of the cavity. If the cavity to be filled is relatively large and deep, the minimum aggregate size should not be less than one-half inch. Graded gravel aggregate is a preferred form for obtaining a relatively small total void space.

Any suitable solidifying composition which does not readily clog hose lines and will flow through and fill the voids and interstices between the individual pieces of aggregate and in the cavity walls may be used in the present process. A particularly desirable material is set forth in my copending application Serial No. 280,141, filed June 20, 1939. As there set forth, it may comprise Portland cement, water, a filling material which contains some acidic colloidal silica in suspension, and an oleaginous material, such as a member of the group consisting of fatty acids, fatty acid esters, and salts, as ammonium stearate, etc. These ingredients are mixed in suitable proportions to form a slurry, the acidic colloidal silica of the filler acting to delay the gelling of the cement and the oleaginous material acting as a plasticizing or lubricating agent. For example, excellent results have been achieved with a mixture having 1 part of Portland cement and 1½ parts of granulated water-quenched blast furnace slag which has been pulverized to a sufficient fineness to pass through a 100 mesh screen, and which has a surface area of at least about 2,200 sq. cm. per gram. To this mixture there is added approximately 12 to 15 gallons of water per sack of cement and a sufficient quantity of an emulsion containing an alkali salt of stearic acid to furnish 1 to 1½ lbs. of stearate per sack of cement. Good results have been achieved by using equal parts of Portland cement and fly ash of low carbon content, for which the fineness as measured in terms of surface area has varied from 2,500 to 3,500 sq. cm. or more per gram.

A suitable quantity of any chemically active silicious material of volcanic or diatomaceous origin, such as volcanic ash, tuff, diatomaceous earth and shale, or other material having similar properties, may be substituted for blast furnace slag with good results in the above example. These materials may be either added to the cement clinker and ground with the cement, or separately added to the cement in a finely divided form.

While any commercial Portland cement can be employed, it has been found that best results are achieved with a cement that is fairly low in the compound tricalcium aluminate and a cement of such fineness that the surface area will be in the neighborhood of 1600 to 1800 or more sq. cm. per gram with all particles passing a screen of 100 meshes to the inch, and a relatively small percentage of particles having a mean diameter of less than 5 microns.

Obviously the amount of water to be used will vary considerably depending upon the size of voids between the aggregate and the voids in the existing structure which define the cavity. It is desirable to use as little water as possible to obtain a consistency which will enable the composition to flow readily and fill the voids and interstices in the cavity.

It has been found desirable in some instances to use fine sand and the like in the solidifying composition, as well as the ingredients named above. The use of sand in the solidifying composition gives a mortar filling having less concentration of cement and therefore less tendency to shrink. The contacting pieces of aggregate in the form as previously explained also tend to reduce shrinkage, so that structures made by the process herein described have relatively low shrinkage.

It is also contemplated that the present invention may be utilized in the construction of new structures, such as walls, dams, bridge abutments, buildings, containers or tanks, etc. In the construction of relatively thin, reinforced walls, and other structures which are configured or located so that placement of concrete is very difficult, the present invention may allow more efficient construction or may permit construction in situations where it was not heretofore practicable.

Figure 6:
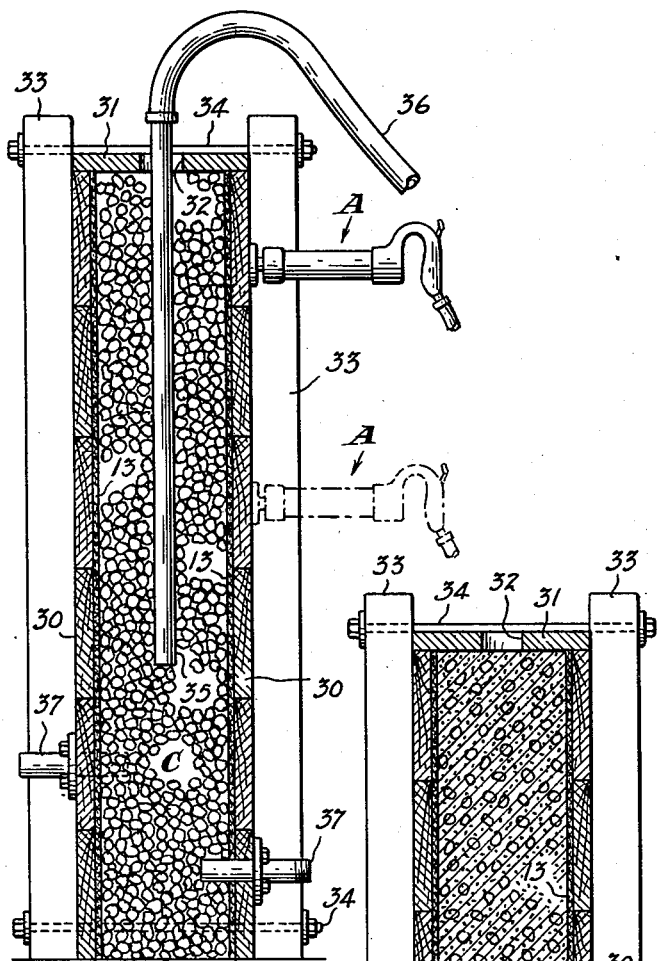
Fig. 6 is an elevational view in section of a portion of a new structure about to be constructed according to the present process.
Figure 8:
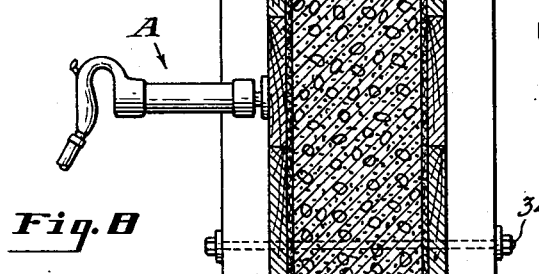
Figs. 7 and 8 are views similar to Fig. 6, illustrating certain steps of the construction method.
Figure 7:
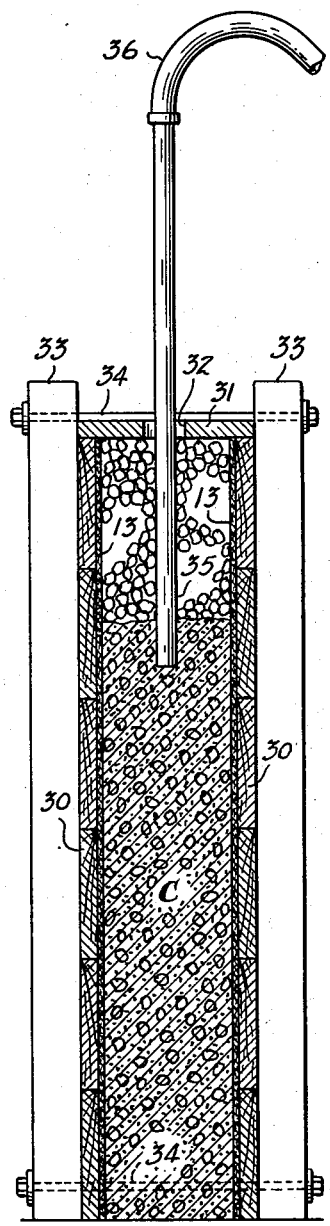

Figs. 6 to 8 show how this construction process may be carried out in the making of a concrete structure, such as a wall. A cavity C is defined by suitable form walls 30, which are shown as made of wood and lined with suitable porous, absorptive material 13. These walls are disposed in proper position and covered by a suitable top wall or cover 31, having one or more apertures 32 therein. The walls 30 are supported in their proper position by supporting elements 33, which supporting elements are braced by suitable bolts 34. While the cavity is empty, nozzles 35 which are connected to conduits or hose lines 36 may be inserted through the apertures 32 in the cover 31 and extend to a position adjacent the bottom of the cavity. The aggregate may be introduced in any suitable manner, either by being forced through the nozzles 35 or introduced into the top of the cavity by removing portions of the cover 31. When the cavity has been filled with aggregate, it may be impacted or vibrated by suitable means, indicated by A, to compact the aggregate and aid in minimizing the total void space in the cavity (see Fig. 6), which void space is to be filled by a solidifying composition.

Next, the solidifying composition may be forced into the cavity between the individual pieces of aggregate through the nozzles 35. As the solidifying composition fills the cavity, the nozzles may be withdrawn, making sure that the level of the composition is above the mouth of the nozzles (see Fig. 7). The solidifying composition may be introduced into the cavity in the manner shown in Fig. 6. A plurality of inserts or fittings 37 may be provided in the form walls 30 to which suitable sources of supply (not shown) may be connected. The supply of solidifying composition may first be connected to the lowermost of the inserts 37, and as the level of the solidifying composition rises within the cavity C, the supply may be successively connected to the higher inserts. By starting the intrusion of the solidifying composition at the bottom of the cavity and working upwardly or outwardly, the possibility of entrainment of air is obviated. After the cavity has been filled and the nozzles, if used, have been withdrawn, the water content of the composition may be decreased as previously described. Fig. 8 shows the cavity when the solidifying composition has been forced into the voids of the cavity and during the time that the vibrating or impacting means A is being used to reduce the water content of the composition in the cavity.

A completed wall built according to the present invention is a solid and dense unit, substantially without voids or porosities in its interior. On setting, there is very little shrinkage, and it may be made to have a strength comparable or exceeding similar structures built according to present construction methods. Furthermore, it is contemplated that the form walls may be a series of joined, relatively thin, precast concrete slabs. Thus, when the structure is completed, they may be left in place and will be securely bonded to the aggregate by the solidifying composition.

Another use of the above described process is in the construction of breakwaters, sea walls, pier foundations, etc. in which a portion of the structure may be immersed. In applying the process to the construction of such structures, the forms may be disposed in their proper positions and the resulting cavity filled with suitable aggregate. Then the solidifying composition may be forced into the voids between the aggregate from conduits or nozzles positioned among the aggregate and terminating in the region of the base of the structure. As the level of the solidifying composition rises and displaces any water present in the cavity, the conduits through which the composition is supplied may be raised accordingly.

The present invention may also be utilized in the forming of decorative surfaces for concrete and other structures. In this modification of the process the forms used preferably have a resilient or yieldable surface disposed adjacent the cavity and sufficient aggregate may be placed in the cavity so that the aggregate will engage and depress portions of the resilient or yieldable form surface. When the solidifying composition is forced between the voids of the aggregate in the cavity, it will fill substantially all of the voids and spaces between the aggregate and the form walls excepting where the aggregate and form wall are in such engagement that the aggregate depresses the surface of the form. After the composition has solidified and the form is removed, the aggregate adjacent the surface of the structure may be left protruding a short distance, but it is securely embedded in the surface and provides a pleasing and decorative appearance. By varying the aggregate used or adding suitable pigments to the solidifying composition, the surface may be colored as desired. Obviously, in this application of the invention, the forms used may be porous or absorptive as well as presenting a yieldable surface adjacent the cavity, so that after the solidifying composition is forced into the cavity the water content thereof may be decreased as previously described. A desirable form lining for this work is a sturdy grade of sponge rubber.

Dwellings, buildings, decorative walls, etc. may be constructed by fabricating relatively thin, precast slabs of concrete of the type mentioned in which the aggregate at the surface protrudes somewhat, and then using these slabs as forms for fabricating the structural walls of the structure in accordance with the previously described process of the present invention. The slabs provide a decorative surface, but at the same time are tightly bonded to the structure.

Cavities filled according to the present invention are desirable in that they may be made dense, strong, durable and highly resistant to weathering. The overall shrinkage of the cavity filling is relatively small due to the use of loose aggregate, the pieces of which may be in intimate contact, such contact being assisted by impacting or vibrating the aggregate. The solidifying composition described has excellent characteristics of flowability, penetration through small passages or interstices without separation of the ingredients thereof, low shrinkage, and even when the water content is not decreased, as described, the strength of the cavity filling may exceed that of structural concretes now in use.

If the cavity to be filled is partially defined by portions of an existing structure, the cavity filling is securely bonded to the existing structure, since the solidifying composition may be forced into the voids and interstices of such structures which are adjacent to or in communication with the cavity, and will solidify and tenaciously adhere to the existing structure. It has been found that the solidifying composition forced into the cavity will penetrate for relatively long distances in interstices of the structure which communicate with the cavity.

It is to be understood that the particular form of the invention shown and described, and the particular procedure set forth are presented for purposes of explanation and illustration, and that various modificaitons may be made without departing from the spirit of my invention.

What I claim is:

1. A process for repairing structures having disintegrated portions in communication with the surface, which comprises removing material from the structure to form a recess having solid walls in the surface of the structure, securing a form over the recess, substantially filling the cavity thus formed with loose aggregate, and forcing readily flowable, hardenable repair material under pressure into the cavity to fill voids between pieces of aggregate and voids of the structure adjacent to or communicating with the cavity.

2. A process for repairing the surface of concrete structures and the like which comprises removing material of the structure, defining a cavity at the surface of the structure by the use of form members, substantially filling the cavity with loose aggregate, and forcing a readily flowable composition comprising Portland cement, a filling material having acidic colloidal silica and a lubricating agent into the cavity and through the aggregate therein.

3. A process for repairing the surfaces of concrete structures and the like which comprises removing faulty portions of the structure to form a recess having solid walls in the surface of the structure, covering the recess with a form, substantially filling the cavity thus formed with loose aggregate, and forcing a readily flowable composition comprising Portland cement, finely divided blast furnace slag and a fatty acid derivative into the cavity and through the aggregate.

4. The method of filling cavities having at least one wall thereof defined by a form having water absorbing properties, which comprises substantially filling the cavity with loose aggregate, forcing a readily flowable solidifying composition containing a hydraulic cement and water into the cavity and through the aggregate, and vibrating the composition while in the cavity to cause the passage of water into the porous form, thereby reducing the water content of the composition.

5. The method of filling cavities having at least one wall thereof defined by a form having water absorbing properties, which comprises substantially filling the cavity with loose aggregate, forcing a readily flowable solidifying composition containing a hydraulic cement and water into the cavity, and creating a pressure difference between the pressure on the composition in the cavity and the pressure outside the form, thereby causing passage of water into the form and a reduction of the water content of the composition.

6. A process for forming decorative wall surfaces which comprises defining the surface by a member having a yieldable surface, enclosing sufficient loose aggregate adjacent said member to cause the aggregate to depress portions of the yieldable surface, forcing a readily flowable, solidifying, cementitious composition through the aggregate, and removing the member whereby the portions of the aggregate which depressed the yieldable surface protrude from the formed surface and present a decorative appearance.

7. A process for filling recesses in the surface of concrete structures and the like, which comprises covering the recess with a form having porous, absorptive properties, substantially filling the cavity thus formed with loose aggregate, compacting the aggregate by a multiplicity of impacts, and forcing a fluid solidifying composition through the aggregate and into contact with the walls of the cavity.

8. A process for filling cavities having at least one wall thereof defined by a form having a surface with water absorbing properties adjacent the cavity, which comprises substantially filling the cavity with loose aggregate, compacting the aggregate by imparting a multiplicity of impacts thereto, forcing a fluid solidifying composition containing cement and water into the voids throughout the aggregate, and creating a pressure difference between the pressure on the composition in the cavity and the pressure outside the form to cause passage of water into the absorptive surface of the form, whereby the water content of the composition is decreased.

9. A process of construction which comprises defining a cavity at least partially by members having a decorative surface at the exterior of the cavity, filling the cavity with loose aggregate, forcing a fluid, solidifying composition into the cavity to bind the aggregate into a unit and to bind the cavity walls securely to the aggregate.

10. A process of construction which comprises enclosing a space with suitable forms for holding concrete, packing such enclosed space with aggregate and placing a conduit leading to a more remote portion of said enclosed space in the aggregate, forcing under pressure a cementitious material of relatively high flowability containing Portland cement, a filling material and a lubricant through said conduit, and continuing the addition under pressure of such material until it substantially fills the voids between the aggregate, whereby concrete is formed having a relatively low amount of shrinkage upon setting.

11. A process of construction which comprises enclosing a space with suitable forms for filling with concrete, packing such space with aggregate, forcing into the more remote portions of said enclosed space a cementitious material of relatively high flowability containing a hydraulic cement, a filling material and a lubricant, and continuing the addition under pressure of such cementitious material until it substantially fills the voids between the aggregate, whereby concrete is formed having a relatively low amount of shrinkage upon setting.

12. A process of construction which comprises defining a space with suitable form members for filling with concrete, substantially filling such space with aggregate, forcing into the more remote portions of said space a hydraulic cementitious material capable of hardening to high strength and sufficiently flowable to penetrate the voids thereof, and continuing the addition under pressure of such cementitious material until it substantially fills the voids between the aggregate, whereby concrete is formed having a relatively low amount of shrinkage upon setting.

13. A process of construction which comprises enclosing a space with suitable forms for filling with concrete, substantially filling such space with aggregate, forcing into the more remote portions of said enclosed space a cementitious material of relatively high flowability containing Portland cement, a filling material containing acidic colloidal silica and an oleaginous material to increase flowability, and continuing the addition under pressure of such cementitious material until it substantially fills the voids between the aggregate, whereby concrete is formed having a relatively low amount of shrinkage upon setting.

LOUIS S. WERTZ.